United States Patent
Lee (10) Patent No.: US 10,717,678 B2
(45) Date of Patent: Jul. 21, 2020

(54) COATING INCLUDING A RARE EARTH SILICATE-BASED LAYER INCLUDING A SECOND PHASE

(75) Inventor: Kang N. Lee, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 904 days.

(21) Appl. No.: 12/569,354

(22) Filed: Sep. 29, 2009

(65) Prior Publication Data

US 2010/0080984 A1    Apr. 1, 2010

Related U.S. Application Data (60) Provisional application No. 61/101,389, filed on Sep. 30, 2008.

(51) Int. Cl.
*C04B 35/16*    (2006.01)
*C09D 7/61*     (2018.01)
(Continued)

(52) U.S. Cl.
CPC ............ *C04B 35/16* (2013.01); *C04B 41/009* (2013.01); *C04B 41/52* (2013.01); *C04B 41/89* (2013.01);
(Continued)

(58) Field of Classification Search
CPC ....... C04B 35/16; C04B 41/009; C04B 41/52; C04B 41/89; C04B 2235/3217; C04B 2235/3224; C23C 28/3215; C23C 28/42; C23C 28/048; C23C 28/321; C23C 28/345; C23C 28/3455; C23C 28/36; C09D 1/00; C09D 7/61; C09D 5/18; C09D 7/1216; Y10T 428/263; C08K 3/22; C08K 3/34
See application file for complete search history.

(56) References Cited

U.S. PATENT DOCUMENTS 3,942,293 A    3/1976 Cook
3,962,059 A    6/1976 Kaup et al.
(Continued)

FOREIGN PATENT DOCUMENTS

CN    103724055 A    4/2014
EP    0845547 A1    3/1998
(Continued)

OTHER PUBLICATIONS

Manning et al., "Thermal Expansion of Nb2O5", Journal of the American Society, vol. 55, Issue 7 Jul. 1972, pp. 342-347.*
(Continued)

*Primary Examiner* — Jonathan C Langman
(74) *Attorney, Agent, or Firm* — Shumaker & Sieffert, P.A.

(57) ABSTRACT

A coating including a bond layer deposited on a substrate. The bond layer includes a rare earth silicate and a second phase, the second phase including at least one of silicon, silicides, alkali metal oxides, alkali earth metal oxides, glass ceramics, $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite. The coating may provide thermal and/or environmental protection for the substrate, especially when the substrate is a component of a high-temperature mechanical system.

32 Claims, 5 Drawing Sheets

(51) Int. Cl.
*C09D 1/00* (2006.01)
*C09D 5/18* (2006.01)
*C04B 41/89* (2006.01)
*C04B 41/52* (2006.01)
*C04B 41/00* (2006.01)
*C23C 28/04* (2006.01)
*C23C 28/00* (2006.01)
*C08K 3/34* (2006.01)
*C08K 3/22* (2006.01)

(52) U.S. Cl.
CPC ............ *C09D 1/00* (2013.01); *C09D 5/18* (2013.01); *C09D 7/61* (2018.01); *C23C 28/042* (2013.01); *C23C 28/048* (2013.01); *C23C 28/321* (2013.01); *C23C 28/3215* (2013.01); *C23C 28/345* (2013.01); *C23C 28/3455* (2013.01); *C23C 28/36* (2013.01); *C23C 28/42* (2013.01); *C04B 2235/3217* (2013.01); *C04B 2235/3224* (2013.01); *C08K 3/22* (2013.01); *C08K 3/34* (2013.01); *Y10T 428/263* (2015.01)

(56) References Cited

U.S. PATENT DOCUMENTS

| | | | |
|---|---|---|---|
| 4,094,673 A | 6/1978 | Erickson et al. | |
| 4,386,968 A | 6/1983 | Hinkel et al. | |
| 4,515,860 A | 5/1985 | Holzl | |
| 4,588,607 A | 5/1986 | Matarese et al. | |
| 4,914,794 A | 4/1990 | Strangman | |
| 4,996,117 A | 2/1991 | Chu | |
| 5,316,851 A | 5/1994 | Brun et al. | |
| 5,320,909 A | 6/1994 | Scharman et al. | |
| 5,350,599 A | 9/1994 | Rigney et al. | |
| 5,391,404 A | 2/1995 | Lee et al. | |
| 5,435,889 A | 7/1995 | Dietrich | |
| 5,660,885 A | 8/1997 | Hasz et al. | |
| 5,714,202 A | 2/1998 | Lemelson et al. | |
| 5,704,759 A | 6/1998 | Draskovich et al. | |
| 5,773,141 A | 6/1998 | Hasz et al. | |
| 5,851,678 A | 12/1998 | Hasz et al. | |
| 5,869,146 A | 2/1999 | McCluskey et al. | |
| 5,871,820 A | 2/1999 | Hasz et al. | |
| 5,914,189 A | 6/1999 | Hasz et al. | |
| 6,057,047 A | 5/2000 | Maloney | |
| 6,261,643 B1 | 7/2001 | Hasz et al. | |
| 6,296,942 B1 | 10/2001 | Eaton, Jr. et al. | |
| 6,299,988 B1 | 10/2001 | Wang et al. | |
| 6,312,763 B1 | 11/2001 | Eaton, Jr. et al. | |
| 6,410,148 B1 | 6/2002 | Eaton, Jr. et al. | |
| 6,465,090 B1 | 10/2002 | Stowell et al. | |
| 6,468,648 B1 | 10/2002 | McCluskey et al. | |
| 6,485,848 B1 | 11/2002 | Wang et al. | |
| 6,517,960 B1 | 2/2003 | Wang | |
| 6,562,409 B2 | 5/2003 | Koshkarian et al. | |
| 6,627,323 B2 | 9/2003 | Nagaraj et al. | |
| 6,720,038 B2 | 4/2004 | Darolia et al. | |
| 6,723,674 B2 | 4/2004 | Wang et al. | |
| 6,733,908 B1 | 5/2004 | Lee et al. | |
| 6,759,151 B1 | 7/2004 | Lee | |
| 6,787,195 B2 | 9/2004 | Wang et al. | |
| 6,812,176 B1 | 11/2004 | Zhu et al. | |
| 6,835,465 B2 | 12/2004 | Allen et al. | |
| 6,887,528 B2 | 5/2005 | Lau et al. | |
| 6,887,595 B1 | 5/2005 | Darolia et al. | |
| 6,890,668 B2 | 5/2005 | Bruce et al. | |
| 6,893,750 B2 | 5/2005 | Nagaraj et al. | |
| 6,902,662 B2 | 6/2005 | Eaton et al. | |
| 6,902,836 B2* | 6/2005 | Eaton et al. ............... 428/701 | |
| 6,933,061 B2 | 8/2005 | Nagaraj et al. | |
| 6,933,066 B2 | 8/2005 | Nagaraj et al. | |
| 7,008,674 B2 | 3/2006 | Nagaraj et al. | |
| 7,056,574 B2 | 6/2006 | Ojard et al. | |
| 7,063,894 B2 | 6/2006 | Sun et al. | |
| 7,090,894 B2 | 8/2006 | Carper et al. | |
| 7,186,466 B2 | 3/2007 | Zhu et al. | |
| 7,226,668 B2 | 6/2007 | Nagaraj et al. | |
| 7,226,688 B2 | 6/2007 | Fujii et al. | |
| 7,354,651 B2 | 4/2008 | Hazel et al. | |
| 7,374,818 B2 | 5/2008 | Bhatia et al. | |
| 7,374,825 B2 | 5/2008 | Hazel et al. | |
| 7,595,114 B2 | 9/2009 | Meschter et al. | |
| 7,666,512 B2 | 2/2010 | Bhatia et al. | |
| 7,695,830 B2 | 4/2010 | Strangman et al. | |
| 7,968,217 B2 | 6/2011 | Sarrafi-Nour et al. | |
| 2002/0098391 A1 | 7/2002 | Tanaka et al. | |
| 2003/0113553 A1* | 6/2003 | Sun et al. ................ 428/446 | |
| 2003/0113559 A1 | 6/2003 | Eaton et al. | |
| 2003/0138658 A1 | 7/2003 | Taylor et al. | |
| 2004/0038085 A1 | 2/2004 | Litton et al. | |
| 2004/0115351 A1 | 6/2004 | Lau et al. | |
| 2004/0151840 A1 | 8/2004 | Wang et al. | |
| 2004/0170849 A1 | 9/2004 | Ackerman et al. | |
| 2004/0234783 A1* | 11/2004 | Eaton ................. C04B 41/009 428/446 |
| 2005/0003172 A1 | 1/2005 | Wheeler et al. | |
| 2005/0129511 A1 | 6/2005 | Allen | |
| 2005/0129973 A1 | 6/2005 | Eaton et al. | |
| 2005/0164027 A1 | 7/2005 | Lau et al. | |
| 2005/0255648 A1 | 11/2005 | Bhatia et al. | |
| 2006/0014029 A1* | 1/2006 | Saak ................. C04B 41/009 428/446 |
| 2006/0024513 A1 | 2/2006 | Schlichting et al. | |
| 2006/0024527 A1 | 2/2006 | Schlichting et al. | |
| 2006/0073361 A1 | 4/2006 | Fukudome et al. | |
| 2006/0078750 A1 | 4/2006 | Zhu et al. | |
| 2006/0110609 A1 | 5/2006 | Eaton et al. | |
| 2006/0115661 A1 | 6/2006 | Hazel et al. | |
| 2006/0154093 A1 | 7/2006 | Meschter et al. | |
| 2006/0166018 A1 | 7/2006 | Spitsberg et al. | |
| 2006/0210800 A1 | 9/2006 | Spitsberg et al. | |
| 2006/0280952 A1 | 12/2006 | Hazel et al. | |
| 2006/0280953 A1 | 12/2006 | Hazel et al. | |
| 2006/0280954 A1 | 12/2006 | Spitsberg et al. | |
| 2006/0280955 A1 | 12/2006 | Spitsberg et al. | |
| 2006/0280963 A1 | 12/2006 | Hazel et al. | |
| 2007/0014996 A1 | 1/2007 | Bhatia et al. | |
| 2007/0082131 A1 | 4/2007 | Doesberg et al. | |
| 2007/0119713 A1 | 5/2007 | Hasz | |
| 2007/0141367 A1 | 6/2007 | Darolia et al. | |
| 2007/0184204 A1 | 8/2007 | Balagopal et al. | |
| 2008/0124479 A1 | 5/2008 | Hazel et al. | |
| 2008/0145674 A1 | 6/2008 | Darolia et al. | |
| 2008/0187767 A1 | 8/2008 | Tang | |
| 2008/0274336 A1 | 11/2008 | Merrill et al. | |
| 2008/0292798 A1 | 11/2008 | Huh et al. | |
| 2009/0102008 A1 | 4/2009 | Kakehata | |
| 2009/0162556 A1 | 6/2009 | Boutwell et al. | |
| 2009/0169914 A1 | 7/2009 | Fu et al. | |
| 2009/0176059 A1 | 7/2009 | Namba et al. | |
| 2009/0184280 A1 | 7/2009 | Lee | |
| 2009/0186237 A1 | 7/2009 | Lee | |
| 2010/0015396 A1 | 1/2010 | Johnson et al. | |
| 2010/0080984 A1 | 4/2010 | Lee | |
| 2010/0129636 A1 | 5/2010 | Cybulsky et al. | |
| 2010/0136349 A1 | 6/2010 | Lee | |
| 2010/0159253 A1 | 6/2010 | Kirby et al. | |
| 2010/0272953 A1 | 10/2010 | Yankowich et al. | |
| 2011/0033630 A1 | 2/2011 | Naik et al. | |
| 2013/0224457 A1 | 8/2013 | Lee | |
| 2014/0072816 A1 | 3/2014 | Lee | |
| 2014/0162027 A1 | 6/2014 | Meschter et al. | |

FOREIGN PATENT DOCUMENTS

| | | | |
|---|---|---|---|
| EP | 1400611 | A1 | 3/2004 |
| EP | 1479661 | A2 | 11/2004 |
| EP | 1626039 | A2 | 2/2006 |
| EP | 1666638 | A1 | 6/2006 |
| EP | 1806435 | A2 | 7/2007 |
| EP | 1829847 | A2 | 9/2007 |
| EP | 1806435 | A3 | 4/2008 |
| EP | 1925694 | A2 | 5/2008 |

(56) References Cited

FOREIGN PATENT DOCUMENTS

| | | | |
|---|---|---|---|
| EP | 1975258 A1 | 10/2008 | |
| EP | 2108715 A2 | 10/2009 | |
| EP | 2189504 A1 | 5/2010 | |
| EP | 2192098 A2 | 6/2010 | |
| EP | 2194164 A1 | 6/2010 | |
| EP | 2208805 A1 | 7/2010 | |
| EP | 2287131 A2 | 2/2011 | |
| EP | 2287138 A2 | 2/2011 | |
| EP | 1925694 A3 | 3/2011 | |
| GB | 2319248 A | 5/1998 | |
| JP | 2006137982 A | 6/2006 | |
| WO | 200064836 A1 | 11/2000 | |
| WO | 2006023894 A2 | 3/2006 | |
| WO | WO-2007-098152 * | 8/2007 | ............... B05D 3/10 |
| WO | 2008103163 A2 | 8/2008 | |
| WO | 2008109214 A2 | 9/2008 | |
| WO | 2009091721 A2 | 7/2009 | |
| WO | 2010039699 A3 | 4/2010 | |

OTHER PUBLICATIONS

Response to Communication pursuant to Rules 161(1) and 162 EPC dated May 17, 2011, from corresponding European application No. 09815469.3, filed Nov. 23, 2011, 6 pp.
Examination Report from corresponding European application No. 09815469.3, dated Feb. 2, 2012, 4 pp.
Office Action from Canadian application No. 2,739,008, dated Feb. 28, 2012, 2 pp.
Office Action from U.S. Appl. No. 12/016,589, dated Dec. 21, 2010, 10 pp.
Response to Office Action dated Dec. 21, 2010, from U.S. Appl. No. 12/016,589, filed Mar. 21, 2011, 11 pp.
U.S. Appl. No. 61/367,067, by Kang N. Lee, filed Jul. 23, 2010.
U.S. Appl. No. 61/466,556, by Kang N. Lee, filed Mar. 23, 2011.
Lee et al., "Rare earth silicate environmental barrier coatings for Si/C/SiC composites and Si3N4 ceramics," Journal of the European Ceramic Society 25: 1705-1715, 2005.
Office Action from U.S. Appl. No. 12/624,938, dated Apr. 5, 2011, 25 pp.
Response to Office Action dated Apr. 5, 2011, from U.S. Appl. No. 12/624,938, filed Jul. 5, 2011, 15 pp.
International Preliminary Report on Patentability from counterpart international application No. PCT/US2009/058765, dated Apr. 14, 2011, 8 pp.
Response to communication dated Feb. 2, 2012, from corresponding European application No. 09815469.3, filed May 30, 2012, 3 pp.
Examination Report from corresponding European application No. 09815469.3, dated Jun. 11, 2012, 5 pp.
U.S. Appl. No. 61/231,510, filed Aug. 5, 2009.
U.S. Appl. No. 61/318,567, filed Mar. 29, 2010.
U.S. Appl. No. 61/329,758, filed Apr. 30, 2010.
International Search Report and Written Opinion of international application No. PCT/US2009/058765, dated May 19, 2010, 13 pp.
Response to Canadian Office Action dated Feb. 28, 2012, from counterpart Canadian application No. 2,739,008, filed Aug. 28, 2012, 10 pp.
Office Action from U.S. Appl. No. 12/016,589, dated Jun. 10, 2011, 9 pp.
Notice of Appeal and Request for Review for U.S. Appl. No. 12/016,589, filed Sep. 12, 2011, 5 pp.
Office Action from Canadian application No. 2,739,008, dated Nov. 29, 2012, 2 pp.
Written Opinion conducted by the Hungarian Patent Office and received from the Intellectual Property Office of Singapore for corresponding Singapore application No. 201102262-1, dated Oct. 18, 2012, 8 pp.
Response to Written Opinion dated Nov. 2, 2012, from corresponding Singapore application No. 201102262-1, filed Apr. 1, 3013, 6 pp.
Shelby et al., "Rare earth Aluminosilicate glasses," Journal of American Ceramic Society, vol. 73, No. 1, 1990, pp. 39-42.
Response to Examination Report dated Jun. 11, 2012, from corresponding European application No. EP09815469.3, filed Dec. 11, 2012, 5 pp.
Response to Canadian Office Action dated Aug. 28, 2013, from Canadian counterpart application No. 2,739,008, filed Feb. 28, 2014, 9 pp.
Examination Report from counterpart European Application No. 09815469.3, dated Jul. 15, 2014, 7 pp.
Office Action from corresponding Canadian application No. 2,739,008, dated Aug. 28, 2013, 3 pp.
Response to Examination Report dated Jul. 15, 2014, from counterpart European Patent Application No. 09815469.3, filed Nov. 13, 2014, 6 pp.
Examination Report from from counterpart European Patent Application No. 09815469.3, dated Dec. 2, 2014, 3 pp.
Response to Written Opinion dated Sep. 24, 2014, from counterpart Singapore Patent Application No. 201102262-1, filed Feb. 24, 2015, 6 pp.
Written Opinion conducted by the Hungarian Patent Office and received from the Intellectual Property Office of Singapore for Counterprt Singapore Application No. 2011022621, dated Sep. 24, 2014, 9 pp.
Response to Examination Report dated Dec. 2, 2014, from counterpart European Patent Application No. 09815469.3, filed Mar. 18, 2015, 30 pp.
Kato et al., "Improvement of High-Temperature Endurance of C/C Composites by Double Coating with SiC and Glass Materials," Journal of Chemical Engineering of Japan, vol. 29, No. 4, Feb. 16, 1996, 6 pp.
Lee et al., "Development and environmental durability of mullite and mullite/YSZ dual layer coatings for SiC and Si3N4 ceramics," Surfaceand Coatings Technology, vol. 86-87, Elsevier B.V., Dec. 1, 1996, pp. 142-148.

\* cited by examiner

COATING INCLUDING A RARE EARTH SILICATE-BASED LAYER INCLUDING A SECOND PHASE

This application claims priority from U.S. Provisional Application Ser. No. 61/101,389 filed Sep. 30, 2008, the entire content of which is incorporated herein by reference.

TECHNICAL FIELD

The invention relates to coatings for high-temperature mechanical systems, such as gas turbine engines, and more particularly to coatings including rare earth silicates.

BACKGROUND

The components of high-temperature mechanical systems, such as, for example, gas-turbine engines, must operate in severe environments. For example, hot section components of gas turbine engines, e.g., turbine blades and/or vanes, exposed to hot gases in commercial aeronautical engines may experience surface temperatures of greater than 1,000° C. Furthermore, economic and environmental concerns, i.e., the desire for improved efficiency and reduced emissions, continue to drive the development of advanced gas turbine engines with higher gas inlet temperatures. As the turbine inlet temperature continues to increase, there is a demand for components capable of operating at such high temperatures.

Components of high-temperature mechanical systems may include ceramic and/or superalloy substrates. Coatings for such substrates continue to be developed to increase the operating capabilities of such components and may include thermal barrier coatings (TBC) and environmental barrier coatings (EBC). In some examples, thermal barrier coatings (TBC) may be applied to substrates to increase the temperature capability of a component, e.g., by insulating a substrate from a hot external environment. Further, environmental barrier coatings (EBC) may be applied to ceramic substrates, e.g., silicon-based ceramics, to provide environmental protection to the substrate. For example, an EBC may be applied to a silicon-based ceramic substrate to protect against the recession of the ceramic substrate resulting from operation in the presence of water vapor in a high temperature combustion environment. In some cases, an EBC may also function as a TBC, although a TBC may also be added to a substrate in addition to an EBC to further increase the temperature capability of a component.

SUMMARY

In general, the disclosure relates to coatings having a bond layer including a rare-earth silicate and a second phase. The second phase may include at least one of silicon, silicides, alkali metal oxides, alkali earth metal oxides, glass ceramics, $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite. In some embodiments, the inclusion of the second phase may facilitate bonding between the rare earth silicate layer and substrate.

In one embodiment, the disclosure is directed to a coating comprising a bond layer deposited on a substrate. The bond layer comprises a rare earth silicate and a second phase, the second phase comprising at least one of silicon, silicides, alkali metal oxides, alkali earth metal oxides, glass ceramics, $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite.

In another embodiment, the disclosure is directed to an article comprising a substrate and a bond layer deposited on the substrate. The bond layer comprises a rare earth silicate and a second phase, the second phase comprising at least one of silicon, silicides, alkali metal oxides, alkali earth metal oxides, glass ceramics, $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite.

In another embodiment, the disclosure is directed to a coating composition comprising a rare earth silicate and a second phase. The second phase comprises at least one of silicon, silicides, alkali metal oxides, alkali earth metal oxides, glass ceramics, $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite.

In another embodiment, the disclosure is directed to a method comprising depositing a bond layer on a substrate. The bond layer comprises a rare earth silicate and a second phase, the second phase comprising at least one of silicon, silicides, alkali metal oxides, alkali earth metal oxides, glass ceramics, $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite.

The details of one or more embodiments of the invention are set forth in the accompanying drawings and the description below. Other features, objects, and advantages of the invention will be apparent from the description and drawings, and from the claims.

DETAILED DESCRIPTION

In general, the disclosure relates to coatings having a bond layer including at least one rare-earth silicate and a second phase. The second phase may include at least one of silicon, silicides, alkali metal oxides, alkali earth metal oxides, glass ceramics, $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite.

As will be described in greater detail below, embodiments of the disclosure include coatings that may be applied to a variety of substrates including ceramic substrates or superalloy substrates. Furthermore, such coatings may have the function of an EBC and/or a TBC on the substrate, e.g., when used as a component of high temperature mechanical system. Accordingly, while some examples of the disclosure may be described with respect to a bond layer including a rare-earth silicate and second phase, as described herein, as part of an environmental barrier coating, e.g., as applied to a silicon-based ceramic substrate, it is appreciated that a bond layer including a rare-earth silicate and second phase as described herein may also be included in a thermal barrier coating, e.g., as applied to a superalloy substrate. As will be described in greater details below, some embodiments of the disclosure may be better characterized and/or used, e.g., as environmental barrier coatings, while other embodiments may be better characterized and/or used, e.g., as thermal barrier coatings.

As previously described, EBCs and TBCs may be applied to substrates to increase the operating capabilities of components of high temperature mechanical systems. For example, EBCs may be applied to silicon-based ceramics to protect against recession of the substrate caused by the volatilization of silica scale by water vapor in the high temperature combustion environment.

An EBC may include a rare earth silicate layer bonded to the silicon-based ceramic substrate via a mullite-based bond layer. The EBC may further require a silicon-based bond layer provided between the substrate and mullite-based bond layer to suitably adhere the mullite-based bond layer to the substrate and to extend the life of the coating.

Notably, phase instability of the mullite-based bond layer of the EBC can present one or more undesirable effects, such as cracking and delamination, which may lead to coating failure. To address such phase instability issues, the mullite-based bond layer may be deposited on the substrate at a high temperature to decrease the amount of amorphous mullite present in the bond layer, reducing the phase instability of the mullite-based bond layer and, thereby, minimize cracking and delamination caused by such phase instability.

However, while the high temperature application of the mullite-based bond layer suitably addresses the phase instability issues, such a high temperature application process can dramatically increase the cost of applying an EBC to a component and decrease the flexibility of manufacturing such components, e.g., by limiting the overall size and/or shape of a component to which the EBC is being applied. Furthermore, the application of a silicon-based bond layer between a substrate and mullite-based bond layer may further increase the cost of manufacturing a component including an EBC in cases in which such a bond layer is required.

As will be described in greater detail below, embodiments of this disclosure include coatings having a bond layer including a rare earth silicate and a second phase that exhibits excellent adherence to a substrate, such as, e.g., a silicon-based ceramic, even without a silicon-bond layer or mullite-based bond layer. Notably, since the bond layer including the rare earth silicate and second phase does not exhibit phase stability issues similar to those described with respect to a mullite based bond layer, the bond layer may be deposited at room temperature without cracking or delamination. Furthermore, embodiments of the bond layer including a rare earth silicate and second phase may exhibit excellent chemical compatibility with other refractory oxides, allowing for the design of composite or multilayer coatings. For example, additional layer(s) including ceramics such as BSAS, rare earth silicates, rare earth oxide-stabilized zirconia, rare earth oxide-stabilized hafnia, or combinations thereof, may be deposited over the bond layer without forming substantial detrimental chemical reactions with the bond layer.

Figure 1:
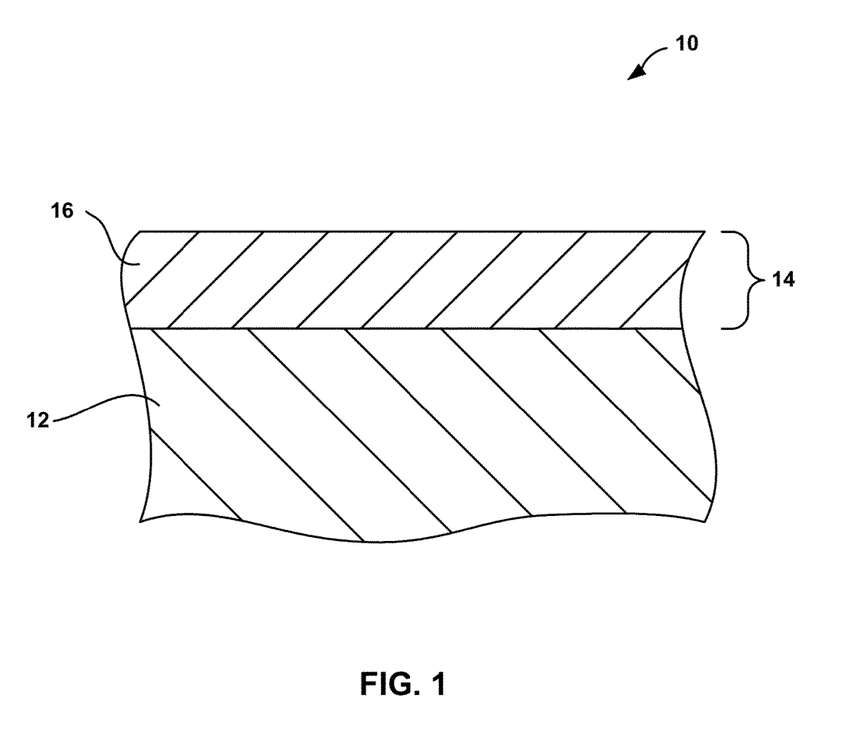
FIG. 1 is a cross-sectional diagram of an example article including an example bond layer.

FIG. 1 is a cross-sectional schematic diagram of an example article 10, which may be used in high temperature mechanical systems. Article 10 includes coating 14 applied to substrate 12. As shown, coating 14 includes bond layer 16 deposited on substrate 12. In general, coating 14 may provide environmental and/or thermal protection to allow article 10 to operate in severe environments, e.g., by preventing recession of substrate 12 or insulating substrate 12 from hot gases during operating.

As noted previously, substrate 12 may be a component of a high temperature mechanical system, such as, e.g., a hot section component of a gas turbine engine. Examples of such components may include, but are not limited to, turbine blades, blade tracks, combustion liners, and the like. Substrate 12 may include silicon-containing ceramics, such as, e.g., silicon carbide (SiC), silicon nitride ($Si_3N_4$), composites having a SiC or $Si_3N_4$ matrix, silicon oxynitride, and aluminum oxynitrides; an silicon containing metal alloy, such as molybdenum-silicon alloys (e.g., $MoSi_2$) and niobium-silicon alloys (e.g., $NbSi_2$); and an oxide-oxide ceramic.

Substrate 12 may include a matrix, such as, e.g., a ceramic matrix composite (CMC), which may include any useful ceramic matrix material, including, for example, silicon carbide, silicon nitride, alumina, silica, and the like. The matrix may further include any desired filler material, and the filler material may include a continuous reinforcement or a discontinuous reinforcement. For example, the matrix may be reinforced with ceramic fibers, whiskers, platelets and chopped or continuous fibers.

The filler composition, shape, size, and the like may be selected to provide the desired properties to the matrix. For example, in some embodiments, the filler material may be chosen to increase the toughness of a brittle ceramic matrix. In other embodiments, the filler may be chosen to provide a desired property to the matrix, such as thermal conductivity, electrical conductivity, thermal expansion, hardness, or the like.

In some embodiments, the filler composition may be the same as the matrix material. For example, a silicon carbide matrix may surround silicon carbide whiskers. In other embodiments, the filler material may include a different composition than the matrix, such as mullite fibers in an alumina matrix, or the like. In one embodiment, a CMC may include silicon carbide continuous fibers embedded in a silicon carbide matrix.

Substrate 12 may also be a superalloy substrate. Typical superalloy substrates 12 include alloys based on Ni, Co, Ni/Fe, and the like. The superalloy substrate 12 may include other additive elements to alter its mechanical properties, such as toughness, hardness, temperature stability, corrosion resistance, oxidation resistance, and the like, as is well known in the art. Any useful superalloy substrate 12 may be utilized, including, for example, those available from Martin-Marietta Corp., Bethesda, Md., under the trade designation MAR-M247; those available from Cannon-Muskegon Corp., Muskegon, Mich., under the trade designations CMSX-4 and CMSX-10; and the like.

Article 10 further includes bond layer 16, which in the example of FIG. 1 is deposited directly on substrate 12. Bond layer 16 includes at least one rare earth silicate. For the purposes of this disclosure, rare earth silicates include those described as $RE_2SiO_5$, $RE_2Si_2O_7$, and combinations thereof, wherein RE=La, Pr, Nd, Pm, Sm, Eu, Gd, Tb, Dy, Ho, Er, Tm, Yb, Lu, Y, or Sc. Such rare earth silicates may generally provide environmental and/or thermal protection of a component to allow it to suitably operate in high temperature mechanical conditions.

Bond layer 16 also includes a second phase in addition to the rare earth silicate. In particular, the second phase may include at least one of silicon, silicides, alkali metal oxides, alkali earth metal oxides, glass ceramics, $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite. It has been found that by including the second phase in addition to the rare earth silicate in layer 16, coating 14 may exhibit excellent adherence to substrate 12 even in the absence of a silicon bond layer and/or a mullite-based bond layer between bond layer 16 and substrate 12, as previously described.

The one or more specific second phase components included in bond layer 16 may be selected to allow for bond layer 16 to exhibit one or more desirable properties. In some cases, certain second phase components listed above may be more desirable for application to certain types of substrates than other. For example, a specific second phase component included in bond layer 16 may enhance the adherence of coating 14 to substrate 12 when substrate 12 includes a silicon-based ceramic, but may not exhibit the same degree of adherence to substrate 12 when substrate 12 includes a superalloy. Accordingly, the second phase component of layer 16 may be selected based on the type of substrate 12 so that coating 14 may exhibit desirable adherence to that substrate 12. For example, a second phase component of silicon in layer 16, such as that described in Example 1 below, or a second phase of silicon and alumina in layer 16 may significantly enhance the bonding of coating 14 on silicon-based ceramics substrates.

As another example, the one or more specific second phase components of bond layer 16 may be selected based on the desired function of coating 14 with respect to substrate 12. As previously described, embodiments of the disclosure include coatings which provide for environmental and/or thermal protection of substrate. In some cases, one or more specific second phase components included in layer 16 may allow coating 14 to provide relatively better environmental protection of substrate 12 compared to thermal protection. Conversely, in other cases, one or more specific second phase components in layer 16 may allow for a coating to provide relatively better thermal protection of substrate 12 compared to thermal protection. For example, in some cases, a second phase including silicate in bond layer 16 may be desirable for environmental protection, while a second phase including zirconia and/or hafnia in bond layer 16 may be desirable for thermal protection.

Bond layer 16 may include the second phase in any amount that allows for adequate adherence of coating 14 to substrate 12 and/or other properties desired of coating 12, e.g., environmental and/or thermal protection. For example, in some embodiments, bond layer 16 may include up to approximately 50 weight percent of the second phase, such as, e.g., approximately 0.1 weight percent to approximately 30 weight percent, or approximately 1 weight percent to approximately 20 weight percent of the second phase.

Bond layer 16 may be deposited on substrate 12 using one or more suitable coating processes. Such processes may include plasma spraying, physical vapor deposition such as EB-PVD (electron beam physical vapor deposition) or DVD (directed vapor deposition), cathodic arc deposition, chemical vapor deposition, slurry dip coating, sol-gel coating, electrophoretic deposition, and combinations thereof. As previously noted, bond layer 16 may be deposited at room temperature without cracking or delamination, unlike that of the mullite-based bond coat previously described.

Bond layer 16 may be deposited at any suitable thickness, such as a thickness that allows for layer 16 to provide environmental and/or thermal protection to article 10 as described herein. For example, in some embodiments, bond layer 16 may have a thickness less than or equal to approximately 100 mils. In one embodiment, bond layer 16 may have thickness in the range of approximately 1 mil to approximately 10 mils. In still another embodiment, bond layer 16 may have thickness in the range of approximately 2 mils to approximately 5 mils.

Notably, while FIG. 1 illustrates bond layer 16 deposited directly on substrate 12, embodiments of the disclosure are not limited to such a configuration. As will be described in greater detail below, coating 14 may include one or more layers other than bond layer 16, which may or may not be deposited between bond layer 16 and substrate 12. Furthermore, although layer 16 is labeled as a "bond" layer, embodiments of the disclosure are not limited to those configurations in which one or more other layers are attached, adhered, and/or bonded to a substrate via bond layer. Instead, while that may be case in some embodiments, other embodiments exist in which a bond layer with a rare earth silicate and second phase, as described herein, does not attach, adhere, and/or bond another layer to substrate via the bond layer, e.g., as shown in FIG. 1 in which bond layer 16 forms the outer surface of coating 14.

Figure 2:
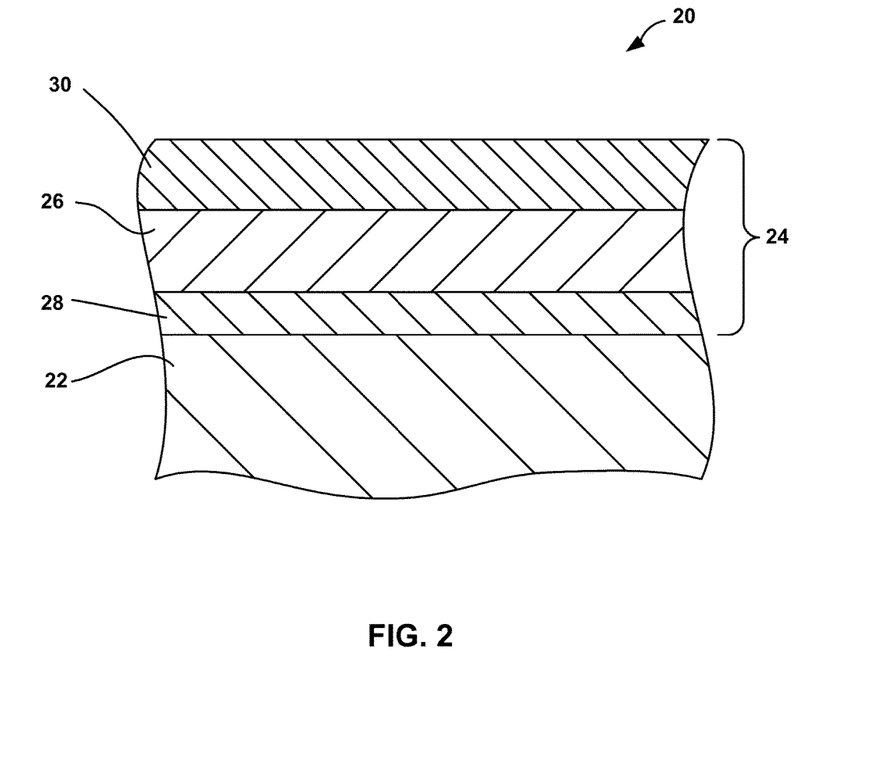
FIG. 2 is a cross-sectional diagram of another example article including an example bond layer.

FIG. 2 is a cross-sectional diagram of example article 20 according to an embodiment of the disclosure. Similar to article 10 of FIG. 1, article 20 may be used in high temperature mechanical systems. Article 20 includes coating 24 applied to substrate 22, and coating 24 may provide environmental and/or thermal protection to allow article 20 to operate in high temperature environments, e.g., by preventing recession of substrate 22 or insulating substrate 22 from hot gases during operating.

As shown, coating 24 includes bond layer 26, intermediate layer 28, and overlay layer 30. In general, substrate 22 may be the same or similar to that of substrate 12 as described with respect to FIG. 1. For example, in some embodiments, substrate 22 may include a superalloy substrate, while in other embodiments substrate 22 may include a silicon containing ceramic substrate.

Furthermore, as described with respect to bond layer 16 of FIG. 1, bond layer 26 includes at least one rare earth silicate and a second phase, the second phase including at least one of comprising at least one of silicon, silicides, alkali metal oxides, alkali earth metal oxides, glass ceramics, $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite.

Coating 24 also includes intermediate layer 28 deposited directly on substrate 22 and provided between bond layer 26 and substrate 22. As configured in FIG. 2, intermediate layer 28 adheres bond layer 26 to substrate 22. While bond layer 26 may be capable of suitably adhering itself to substrate 22, such as shown in FIG. 1, optionally, bond layer 26 may be adhered to substrate 22 via intermediate layer 28. In some cases, intermediate layer 28 may increase the adherence of bond layer 26 to substrate 22, as compared to a configuration in which bond layer 26 adheres itself to substrate 22.

Intermediate layer 28 may include at least one of silicon, silicides, a MCrAlY alloy, wherein M is selected from Ni, Co, and NiCo, a β-NiAl alloy, a β-PtNiAl alloy, a γ-Ni+γ'-Ni$_3$Al alloy, or a γ-Ni+γ'-Ni$_3$Al alloy modified by at least one of Pt, Hf, or Si. The specific components of intermediate layer 28 may be selected based on one or more factors associated with article 20, including the composition of substrate 22 and/or bond layer 26. For example, in some cases, intermediate layer 28 including at least one of silicon or silicides may be appropriate to adhere bond layer 26 to substrate 22 in embodiments in which substrate 22 is includes a silicon-based ceramic material and/or bond layer 26 includes a second phase including silicon or silicides. Similarly, intermediate layer 28 may include one or more of the alloys listed above rather than, or in addition to, silicon or silicides, in embodiments in which substrate 22 includes a superalloy.

In the example of FIG. 2, coating 24 further includes overlay layer 30 provided on top of bond layer 26. Some embodiments of the disclosure may optionally include such an overlay layer to provide additional environmental and/or thermal protection for article 20. Accordingly, layer 30 may comprise one or more components that allow for environmental and/or thermal protection as desired. For example, overlay layer 30 may include at least one of glass ceramics, rare earth silicates, zirconia stabilized by rate earth oxides, or hafnia stabilized by rare earth oxides. Example glass ceramics include BAS, SAS, BSAS, CAS, LAS, and MAS. Zirconia and hafnia may be stabilized by a single or multiple rare earth oxides, forming t' phase, cubic phase, rare earth-zirconia compounds, rare earth-hafnia compounds, and combinations thereof.

Overlay layer 30 may be deposited at any suitable thickness, such as a thickness that allows for layer 30 to provide desirable environmental and/or thermal protection to article 10 as described herein. For example, in some embodiments, overlay layer 30 may have a thickness less than or equal to approximately 100 mils. In one embodiment, overlay layer 30 may have a thickness in the range of approximately 1 mil to approximately 20 mils. In still another embodiment, overlay layer 30 may have a thickness in the range of approximately 5 mils to approximately 10 mils.

Similar to the bond layer, intermediate layer 28 and/or overlay layer 30 may be deposited using one or more suitable coating processes. Such processes may include plasma spraying, physical vapor deposition, cathodic arc deposition, chemical vapor deposition, slurry dip coating, sol-gel coating, electrophoretic deposition, and combinations thereof.

As shown in FIG. 2, overlay layer 30 may be deposited directly on bond layer 26. However, in some embodiments, it may be desirable to include a transition layer between bond layer 26 and overlay layer 30, e.g., depending on the respective compositions of bond layer 26 and overlay layer 30. For example, such a transition layer may be included to reduce the strain on the interface of overlay layer 30 and bond layer 26 of coating 24 during thermal cycling for cases in which bond layer 26 and overlay layer 30 exhibit different coefficients of thermal expansion.

Figure 3A:
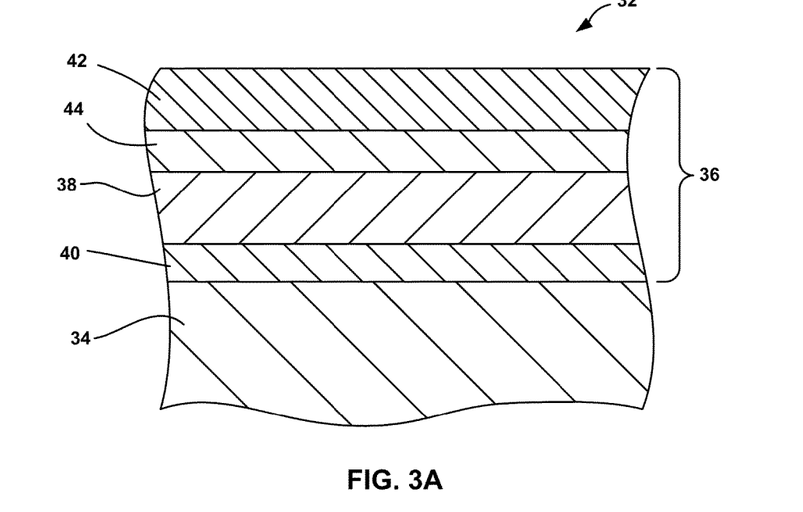
FIGS. 3A and 3B are cross-sectional diagrams of example articles including an example transition layer between an example bond layer and an example overlay layer.
Figure 3B:
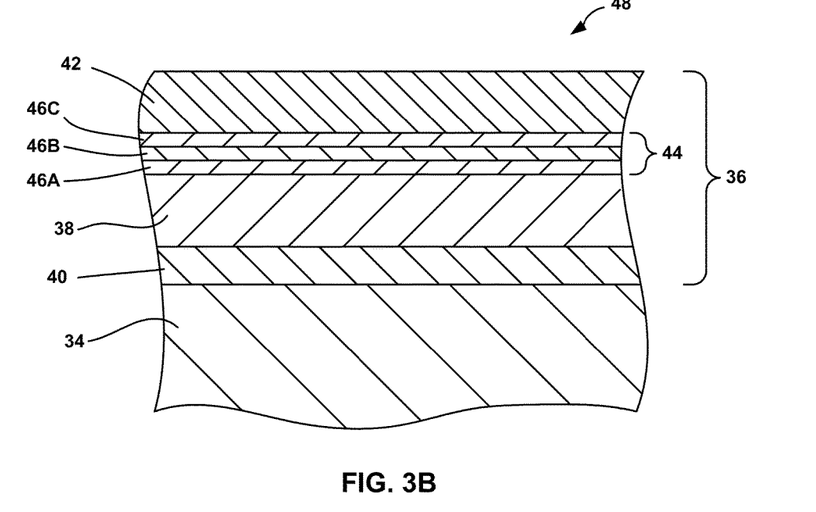

FIGS. 3A and 3B are cross-sectional diagrams of example articles 32 and 48, respectively, including an example transition layer 44 between bond layer 38 and overlay layer 42. In each example, articles 32 and 48 include coating 36 applied to substrate 34. Coating 36 includes intermediate layer 40, bond layer 38, transition layer 44 and overlay layer 42.

Intermediate layer 40, bond layer 38, and overlay layer 42 are substantially the same intermediate layer 28, bond layer 26, and overlay layer 30, respectively, described with respect to FIG. 2. Intermediate layer 40 is deposited directly on substrate 34 and is provided between substrate 34 and bond layer 38.

Unlike the embodiment shown in FIG. 2, coating 36 includes transition layer 44 provided between overlay layer 42 and bond layer 38. As previously mentioned, transition layer 44 may function to reduce the strain on the interface of overlay layer 42 and bond layer 38 during thermal cycling for cases in which bond layer 38 and overlay layer 42 exhibit different coefficients of thermal expansion. In some examples, transition layer 44 may provide chemical compatibility and/or thermal expansion transition between bond layer 38 and overlay layer 42.

As illustrated by FIGS. 3A and 3B, the structure and composition of transition layer 44 may vary, and may be selected based on one or more factors. With reference to FIG. 3A, transition layer 44 may be a single layer and may have a substantially uniform composition throughout. In some embodiments, transition layer 44 may include at least one of $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite.

The composition of transition layer 44 may be selected based on the composition of bond layer 38 and/or overlay layer 42. For example, the composition of bond layer 38 and overlay layer 42 may generally dictate the coefficient of thermal expansion for the respective layers. Transition layer 44 may include one or more components which allow for transition layer 44 to have a coefficient of thermal expansion that is in between that of the coefficients of thermal expansion of bond layer 38 and overlay layer 42. In this manner, the difference in thermal expansion between bond layer 38 and overlay layer 42 may be tempered by the thermal expansion of transition layer 44 when configured as shown in FIG. 3A.

In some embodiments, alternately or additionally, the composition of transition layer 44 may be selected to provide suitable adhesion between transition layer 44 and bond layer 38, and also between transition layer 44 and overlay layer 42. For example, transition layer 44 including component X may better adhere to overlay layer 42 when overlay layer includes one or more glass ceramic as compared to when overlay layer 42 includes zirconia stabilized by rate earth oxides. Similarly, transition layer 44 including component Y may better adhere to bond layer 38 when bond layer 38 includes silicon as the second phase as compared to when bond layer 38 includes $Al_2O_3$ as the second phase.

In some embodiments, transition layer 44 may include one or more components of both bond layer 38 and overlay layer 42. For example, when bond layer 38 includes component X and overlay layer 42 includes component Y, transition layer 44 may include a mixture of component X and component Y. The mixture may include an approximately equal amount of the components of bond layer 38 and overlay layer 42, or may include any other desired mixture or proportion of components from bond layer 38 and overlay layer 42.

Transition layer 44 may be applied as a separate layer from bond layer 38 and overlay layer 42. For example, bond layer 38 may be applied first by plasma spraying. The desired mixture of the bond layer components and the overlay layer components may then be mixed and applied to bond layer 38 by plasma spraying to form transition layer 44, followed by application of overlay layer 42 on transition layer 44.

Additionally in some embodiments, transition layer 44 may include more than one sublayer. With reference to FIG. 3B, for example, transition layer 44 includes three sublayers 46A, 46B, and 46C. However, a transitional layer, e.g., transitional layer 44, may include as many or as few sublayers as is desired. For example, transitional layer 44 may include one layer, up to three sublayers, three sublayers, or more than three sublayers.

In some embodiments, a transition layer having one or more sublayers may allow for the interface between bond layer 38 and overlay layer 42 to be compositionally graded. Such compositional grading may reduce the strain on the interface of overlay layer 42 and bond layer 38 during thermal cycling for cases in which bond layer 38 and overlay layer 42 exhibit different coefficients of thermal expansion.

As one example of a compositionally graded transition layer, with reference to transition layer 44 of FIG. 3B, sublayer 46A may be compositionally most similar to layer 38, e.g., sublayer 46A may include more than 50% (by weight, volume, moles, or the like) of components that form bond layer 38. For example, sublayer 46A may include about 90% (by weight, volume, moles, or the like) bond layer 38 components and about 10% (by weight, volume, moles, or the like) overlay layer 42 components. Sublayer 46B, then, may include an approximately equal amount of components from bond layer 38 and overlay layer 42, or approximately 50% (by weight, volume, moles, or the like) bond layer 38 components, and about 50% (by weight, volume, moles, or the like) overlay layer 42 components. Finally, sublayer 46C may be more compositionally similar to the overlay layer. For example, sublayer 46C may include more than 50% (by weight, volume, moles, or the like) of overlay layer 42 components. In one embodiment, sublayer 46C may include about 90% (by weight, volume, moles, or the like) overlay layer 42 components and about 10% (by weight, volume, moles, or the like) bond layer 38 components.

In this manner the inclusion of transitional layer 44 may reduce the coefficient of thermal expansion gradient, or in other words, make the compositional transition from the bond layer 38 to overlay layer 42 more gradual, thus making the change of coefficients of thermal expansion more gradual.

It may be understood that the more sub-layers included in the transitional layer, the lower the interfacial stresses due to mismatches of coefficients of thermal expansion. The number of sub-layers in the transitional layer need not be limited, but may be chosen according to the desired properties of the article and the time and expense involved in producing the article.

Furthermore, a coating may also include a transition layer that is not divided into sub-layers, but which includes a continuously graded composition. For example, the transition layer may be compositionally most similar to the bond layer at the bond layer-transitional layer interface, and most similar to the overlay layer at the overlay layer-transitional layer interface, with a composition that continuously transitions from the bond layer composition to the overlay layer composition along the depth of the transitional layer.

EXAMPLES

Example 1

Figure 4:
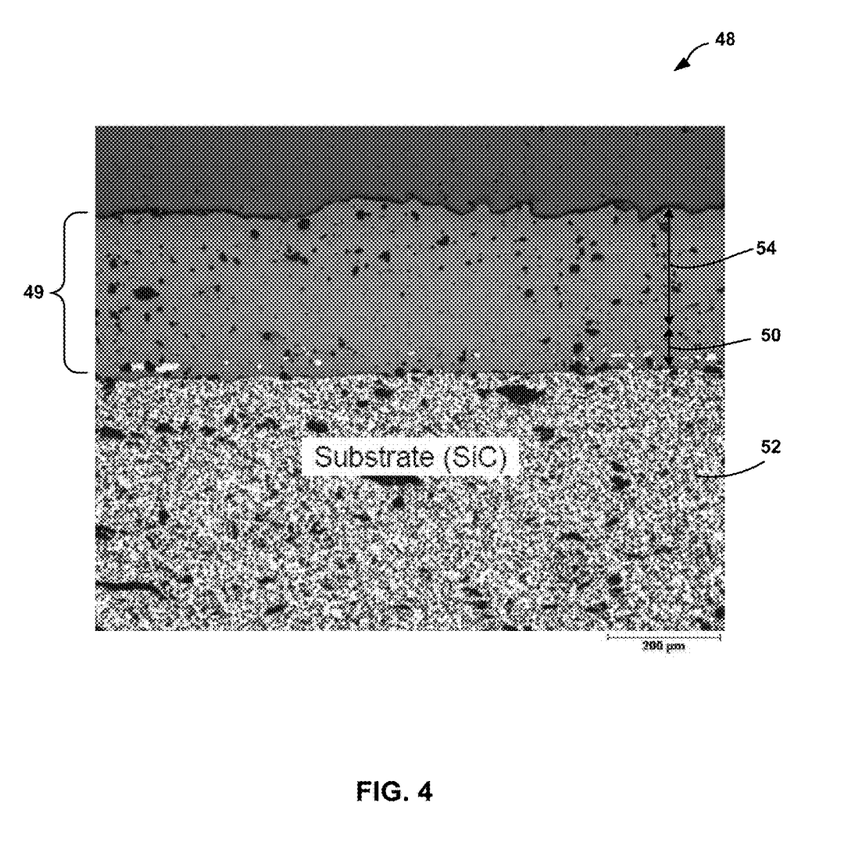
FIG. 4 is a cross-sectional photograph of an example article including an example bond layer.

FIG. 4 shows a cross-sectional photograph of an example article 48. Article 48 included coating 49 provided on a silicon carbide ceramic substrate 52. Coating 49 included an overlay layer 54 and bond layer 50. Bond layer 50 was deposited directly on substrate 52 and included $Yb_2Si_2O_7$ and silicon. The silicon was present in bond layer 50 in a concentration of approximately 20 percent by weight. Overlay layer 54 was deposited on bond layer 50 and included $Yb_2Si_2O_7$. Both bond layer 50 and overlay layer 54 were deposited on substrate 52 by air plasma spraying at room temperature, which was approximately 23 degrees Celsius. Article 48 was subsequently exposed to steam thermal cycling in an environment of approximately 1400 degrees Celsius and approximately 90 percent $H_2O$—$O_2$, to simulate the concentration of water vapor in a combustion environment, prior to the photograph. The cycling involved periodically exposing the article 48 to the described environment in approximately one hour cycles for a total of approximately 100 hours.

As illustrated by the photograph of FIG. 4, bond layer 50 and overlay layer 54 were substantially crack-free after article 48 underwent the steam thermal cycling and maintained excellent adherence to substrate 52. Additionally, the oxidation of substrate 52 was minimal, as evidenced by the lack of oxide scale formed between coating 49 and substrate 52, indicating that coating 49 provided excellent environmental protection for article 48.

Example 2

Figure 5:
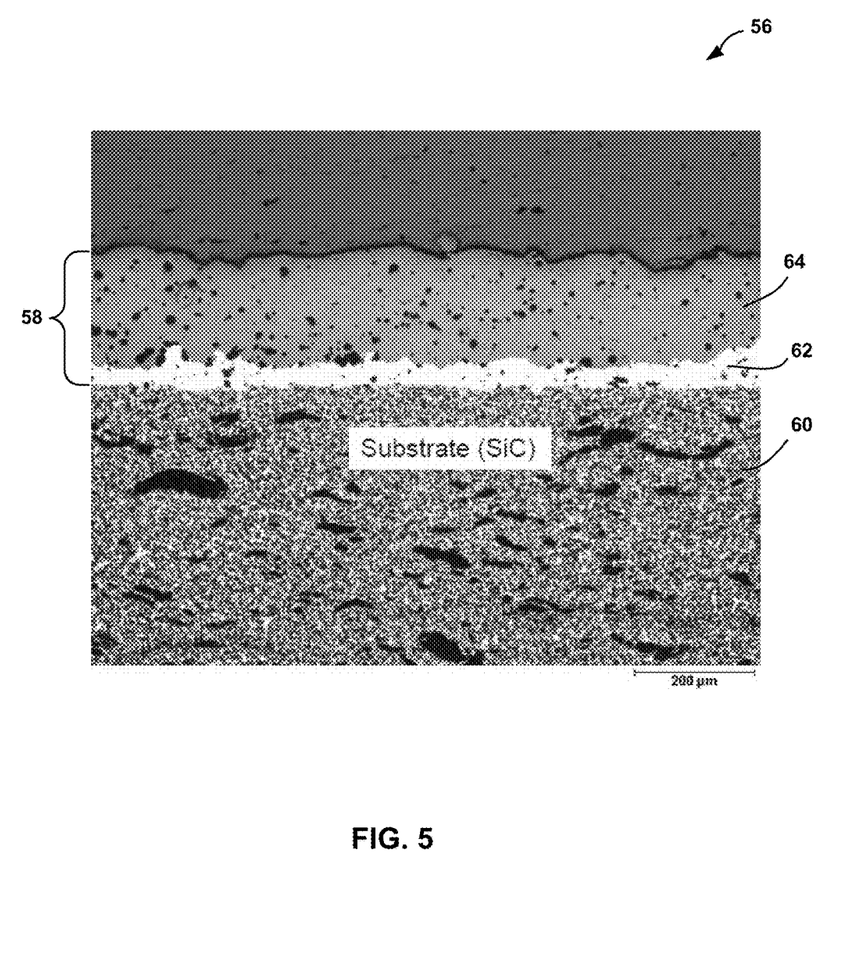
FIG. 5 is a cross-sectional photograph of an example article including an example bond layer.

FIG. 5 shows a cross-sectional photograph of an example article 56. Article 56 included coating 58 provided on silicon carbide ceramic substrate 60. Coating 58 included intermediate layer 62 and bond layer 64. Intermediate layer 62 was deposited directly on substrate 60 and included silicon. Bond layer 64 was deposited on the silicon intermediate layer 62 and included $Yb_2Si_2O_7$ and $Al_2O_3$. The $Al_2O_3$ was present in bond layer 64 in a concentration of approximately 5 percent by weight. Both bond layer 64 and intermediate layer 62 were deposited on substrate 60 by air plasma spraying at room temperature, which was approximately 23 degrees Celsius. Article 56 was subsequently exposed to steam thermal cycling in an environment of approximately 1300 degrees Celsius and approximately 90 percent $H_2O$—$O_2$, to simulate the concentration of water vapor in a combustion environment, prior to the photograph. The cycling involved periodically exposing the article 56 to the described environment in approximately one hour cycles for a total of approximately 100 hours.

As illustrated by the photograph of FIG. 5, bond layer 64 and intermediate layer 62 were substantially crack-free after article 56 underwent the steam thermal cycling and maintained excellent adherence to substrate 60. Additionally, the oxidation of substrate 60 was minimal, as evidenced by the lack of oxide scale formed between coating 58 and substrate 60 indicating that coating 58 provided excellent environmental protection for article 56.

Various embodiments of the invention have been described. These and other embodiments are within the scope of the following claims.

The invention claimed is:

1. A coating comprising:
   a bond layer on a ceramic substrate, the bond layer consisting essentially of a rare earth silicate and a second phase, the second phase comprising at least one of a silicide, a glass ceramic, $Al_2O_3$, $TiO_2$, $HfO_2$, $HfSiO_4$, $ZrSiO_4$, $HfTiO_4$, or $ZrTiO_4$;
   an overlay layer on the bond layer, wherein the bond layer is between the overlay layer and substrate, and wherein the bond layer includes up to approximately 30 percent by weight of the second phase; and
   a silicon bond layer between the substrate and the bond layer, wherein the bond layer is directly on the silicon bond layer, wherein the silicon bond layer is directly on an outer ceramic surface the ceramic substrate, and wherein the silicon bond layer does not include the second phase.

2. The coating of claim 1, wherein the bond layer includes approximately 0.1 percent by weight to approximately 30 percent by weight of the second phase.

3. The coating of claim 2, wherein the bond layer includes approximately 1 percent by weight to approximately 20 percent by weight of the second phase.

4. The coating of claim 1, wherein the overlay layer comprises at least one of a glass ceramic, a rare earth silicate, a zirconia stabilized by a rare earth oxide, or a hafnia stabilized by a rare earth oxide.

5. The coating of claim 4, further comprising a transition layer between the bond layer and the overlay layer.

6. The coating of claim 5, wherein the transition layer comprises at least one of $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite.

7. The coating of claim 5, wherein the transition layer comprises a mixture of components of the bond layer and components of the overlay layer.

8. The coating of claim 5, wherein the transition layer has a coefficient of thermal expansion which is in between a bond layer coefficient of thermal expansion and an overlay layer coefficient of thermal expansion.

9. The coating of claim 4, wherein the overlay layer is less than or equal to approximately 100 mils thick.

10. The coating of claim 1, wherein the bond layer is less than or equal to approximately 100 mils thick.

11. The coating of claim 1, wherein the overlay layer forms an outer surface of the coating, and wherein the overlay layer comprises a rare earth silicate.

12. The coating of claim 1, wherein the second phase comprises the $Al_2O_3$.

13. The coating of claim 1, wherein the second phase is the $Al_2O_3$.

14. The coating of claim 1, wherein the ceramic substrate comprises silicon carbide.

15. The coating of claim 1, wherein the ceramic substrate comprises a ceramic matrix composite substrate.

16. An article comprising:
a ceramic substrate;
a bond layer on the ceramic substrate, the bond layer consisting essentially of a rare earth silicate and a second phase, the second phase including at least one of a silicide, a glass ceramic, $Al_2O_3$, $TiO_2$, $HfO_2$, $HfSiO_4$, $ZrSiO_4$, $HfTiO_4$, or $ZrTiO_4$; and
an overlay layer deposited on the bond layer, wherein the bond layer is between the overlay layer and substrate, and wherein the bond layer includes up to approximately 30 percent by weight of the second phase, wherein the bond layer is directly on an outer ceramic surface of the ceramic substrate.

17. The article of claim 16, wherein the bond layer includes approximately 0.1 percent by weight to approximately 30 percent by weight of the second phase.

18. The article of claim 17, wherein the bond layer includes approximately 1 percent by weight to approximately 20 percent by weight of the second phase.

19. The article of claim 16, wherein the overlay layer comprises at least one of a glass ceramic, a rare earth silicate, a zirconia stabilized by a rare earth oxide, or a hafnia stabilized by a rare earth oxide.

20. The article of claim 19, further comprising a transition layer between the bond layer and the overlay layer.

21. The article of claim 20, wherein the transition layer comprises at least one of $Al_2O_3$, $TiO_2$, $Ta_2O_5$, $HfO_2$, $ZrO_2$, $HfSiO_4$, $ZrSiO_4$, $HfTiO_4$, $ZrTiO_4$, or mullite.

22. The article of claim 20, wherein the transition layer comprises a mixture of components of the bond layer and components of the overlay layer.

23. The article of claim 20, wherein the transition layer has a coefficient of thermal expansion which is in between a bond layer coefficient of thermal expansion and an overlay layer coefficient of thermal expansion.

24. The article of claim 19, wherein the overlay layer is less than or equal to approximately 100 mils thick.

25. The article of claim 14, wherein the bond layer is less than or equal to approximately 100 mils thick.

26. The article of claim 16, wherein the overlay layer forms an outer surface of the article, and wherein the overlay layer comprises a rare earth silicate.

27. The article of claim 6, wherein the second phase comprises the $Al_2O_3$.

28. The article of claim 16, wherein the second phase is the $Al_2O_3$.

29. The article of claim 16, wherein the ceramic substrate comprises silicon carbide.

30. The article of claim 16, wherein the ceramic substrate comprises a ceramic matrix composite substrate.

31. A coating comprising:
a bond layer on a ceramic substrate, the bond layer consisting essentially of a rare earth silicate and a second phase, the second phase comprising at least one of a silicide, a glass ceramic, $Al_2O_3$, $TiO_2$, $HfO_2$, $HfSiO_4$, $ZrSiO_4$, $HfTiO_4$, or $ZrTiO_4$; and
an overlay layer on the bond layer, wherein the bond layer is between the overlay layer and substrate, and wherein the bond layer includes up to approximately 30 percent by weight of the second phase, wherein the bond layer is directly on an outer ceramic surface of the ceramic substrate.

32. An article comprising:
a ceramic substrate;
a bond layer on the ceramic substrate, the bond layer consisting essentially of a rare earth silicate and a second phase, the second phase including at least one of a silicide, a glass ceramic, $Al_2O_3$, $TiO_2$, $HfO_2$, $HfSiO_4$, $ZrSiO_4$, $HfTiO_4$, or $ZrTiO_4$;
an overlay layer deposited on the bond layer, wherein the bond layer is between the overlay layer and substrate, and wherein the bond layer includes up to approximately 30 percent by weight of the second phase; and
a silicon bond layer between the substrate and the bond layer, wherein the bond layer is directly on the silicon bond layer, wherein the silicon bond layer is directly on an outer ceramic surface the ceramic substrate, and wherein the silicon bond layer does not include the second phase.

* * * * *

UNITED STATES PATENT AND TRADEMARK OFFICE
CERTIFICATE OF CORRECTION

PATENT NO. : 10,717,678 B2  
APPLICATION NO. : 12/569354  
DATED : July 21, 2020  
INVENTOR(S) : Kang N. Lee Page 1 of 1

It is certified that error appears in the above-identified patent and that said Letters Patent is hereby corrected as shown below:

In the Claims

Column 12, Line 15 (Claim 27): Replace "claim 6," with --claim 16,--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*